United States Patent [19]

Klein et al.

[11] Patent Number: 4,472,471
[45] Date of Patent: Sep. 18, 1984

[54] CHAIR MAT

[75] Inventors: William G. Klein, Stoughton; Bernard M. Brenner, Weston, both of Mass.

[73] Assignee: United Technical Products Inc., Westwood, Mass.

[21] Appl. No.: 343,113

[22] Filed: Jan. 27, 1982

[51] Int. Cl.³ .......................... B32B 3/00; B32B 3/02; B32B 5/16; G21K 1/10
[52] U.S. Cl. .................................. 428/172; 361/212; 361/220; 428/38; 428/192; 428/203; 428/204; 428/212; 428/255; 428/256; 428/922; 428/929; 428/931
[58] Field of Search ................ 219/203, 522; 361/212, 361/217, 220; 428/38, 204, 209, 256, 922, 156, 172, 192, 203, 206–208, 212, 255, 323, 327–330, 924, 929, 931

[56] References Cited

U.S. PATENT DOCUMENTS

| 1,959,982 | 5/1934 | Loeser | 361/217 |
| 2,416,202 | 2/1947 | Naumann | 428/922 |
| 4,208,696 | 6/1980 | Lindsay et al. | 428/922 |

FOREIGN PATENT DOCUMENTS

| 611463 | 12/1960 | Canada | 428/922 |
| 2310166 | 9/1973 | Fed. Rep. of Germany | 428/922 |

Primary Examiner—Bruce H. Hess
Attorney, Agent, or Firm—John G. Heimovics

[57] ABSTRACT

This invention describes a transparent chair mat having anti-static qualities. The chair mat is substantially transparent thereby permitting the carpet thereunder to be readily seen. The chair mat can be gounded or not, as desired. This anti-static chair mat enables castered chairs to roll over it without the person sitting in the chair generating excess static-electricity.

9 Claims, 5 Drawing Figures

CHAIR MAT

BACKGROUND OF THE INVENTION

1. Field of the Invention

This invention relates to means for reducing the generation of static electricity, and more particularly, relates to a unique and novel chair mat having a construction such that when castered furniture, such as a secretary's chair, rolls across the surface of this chair mat the generation of static electricity is greatly reduced.

2. Background of the Prior Art

With the advent of computers and word processing equipment the static generation caused, especially during cold weather, by the movements of personnel and by the rolling of castered chairs across floor coverings has caused many problems. The static electricity may cause computers or their associated terminals to malfunction, or the memory systems of some word processors may be disturbed or completely lose the material stored therein.

It is well known in the prior art that chair mats usually made of plastic material are placed on top of carpeting in offices so that when castered furniture rolls across the surface of the mat it does so more easily than rolling across the surface of a carpeted floor. Many offices throughout this country use such chair mats.

In order to avert the static problems mentioned above, one of the prior art items that was produced was a chair mat made of plastic with a high loading of carbon black material. The electrical conductivity provided by the carbon proved effective in controlling static by (1) suppressing the generation of static arising from motions of persons or chairs on the mat, and (2) dissipating static charges carried by personnel approaching from an area having static-prone floor covering. However, this type of chair mat had serious drawbacks in that it was made of a material which curled under continuous pressure and was black in color, thereby not blending with the decor of the office nor, in particular, with the carpeted floor covering. A further drawback was the apparent necessity of electrically grounding such black prior art mat to insure its static control efficacy, said grounding having been prescribed by every supplier of such a mat. It is a demonstrable fact that, in the great majority of office applications, a properly designed ungrounded mat can effectively control static so that the performance of adjacent sensitive electronic equipment is not affected thereby.

To perform effectively, an anti-static mat must achieve two objectives: (1) it must suppress the generation of static voltages below the level which will cause problems with electronic equipment, and (2) it must dissipate static charges which may be carried by personnel coming from a static-prone area and approaching the electronic equipment to be safeguarded. As to the first of these, static generation arises from ordinary movements of people and furniture upon a floor or floor covering. The magnitude of static charge depends on the materials involved, the nature of the motion and the relative humidity. Even on a theoretical basis, the presence or absence of an electrical connection between the mat and ground has no bearing on static generation.

An effective anti-static mat must be conductive to a degree. When an approaching charged person steps onto the mat, the charge flows from his shoe soles into the mat. If the mat is grounded, then the charge is dissipated through the wire to ground. Voltage on the person and on the mat is quickly reduced to zero. However, if the mat is not grounded, then a charged person stepping onto the mat shares that charge with the mat, but not equally. The mat assumes the greatest portion of the charge, since its capacitance to ground far exceeds that of the person. As a consequence, the voltage on the person drops quickly to a small fraction of its initial value, so that any static discharge which may then occur (from the person's finger, for example) contains so little energy that no electronic equipment is disturbed. Furthermore, since even an ungrounded mat is never perfectly isolated from ground, any residual charge on the mat leaks continuously to ground through the underlying floor covering and approaches zero in a relatively short period of time. Grounding of an anti-static mat merely offers a slight, and usually inconsequential, improvement in the speed with which body voltage is reduced to a safe level.

The conclusion which may be drawn from the foregoing, and which has been borne out in thousands of actual cases, is that an anti-static mat which incorporates suitable conductivity in its face and through its thickness may offer effective static control with all classes of sensitive electronic equipment under most circumstances, even if the mat is not grounded.

SUMMARY OF THE INVENTION

This invention relates to a unique chair mat used in conventional offices with conventional carpeted floor covering to eliminate or reduce the generation of static electricity to a sufficiently low level so that the operation of computers, word processors, and other electronic equipment is not hampered or endangered.

It is therefore an object of this invention to provide an anti-static chair mat for castered furniture whereby the static generated by moving chairs or personnel is greatly decreased over that of other types of chair mats.

It is another object of this invention to provide such a chair mat whereby static charges carried by personnel approaching from static-prone areas will be safely dissipated, whether or not the mat is electrically grounded.

It is another object of this invention to provide such a chair mat so that the underlying carpeting is seen through the mat, which is transparent and made of substantially clear plastic materials.

It is another object of this invention to provide such a chair mat that has a lightly inked grid pattern on one of its inner surfaces such that it will reduce the generation and enhance the dissipation of static electricity.

And yet another advantage of the invention is the provision that such a chair mat can be grounded to either metal furniture, a common ground such as electrical ground through a socket, or any other ground means by a unique combination utilizing a conductive washer that is not in direct contact with the conductive layer of the invention.

The above and further objects and features will be more readily understood by reference to the following detailed description and accompanying drawings.

DESCRIPTION OF THE PREFERRED EMBODIMENTS OF THE INVENTION

Figure 1:
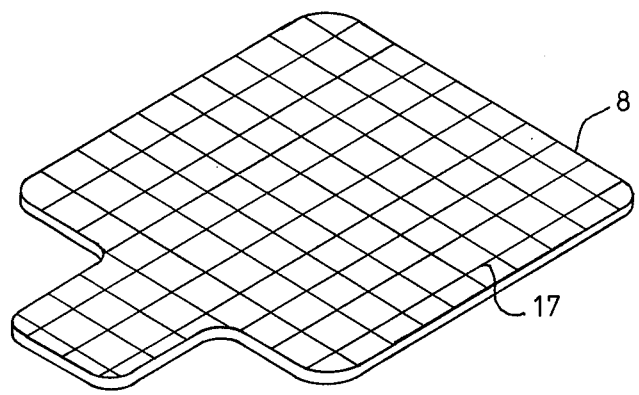
FIG. 1 is a perspective view of the invention described herein.
Figure 2:
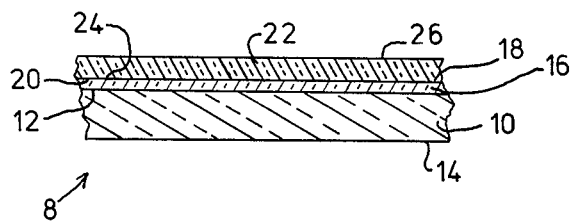
FIG. 2 is a cross section segment taken of the invention hereof along section lines 2—2 found in FIG. 1.

In FIG. 1, a perspective view of our novel anti-static chair mat 8 is depicted having rectangular grid lines within the body thereof. The laminate structure used in the invention is better seen by reference to FIG. 2 wherein the mat 8 comprises a base layer 10 usually made of conventional clear plastic material and having an upper surface 12 and a lower surface 14. In some instances it has been found that outwardly projecting lugs can be incorporated into the surface 14 in order to better secure the mat to a carpeted or textile type surface. Secured to the upper surface 12 is conductive layer 16 which has a first surface 20 which is in direct contact with and secured to the upper surface 12 and the second surface 18 which is the upper surface of the conductive layer. Secured to the conductive layer 16 at second surface 18 is the inner surface 24 of the top plastic layer 22. The outer surface 26 of top layer 22 comprises the surface upon which castered furniture, such as rolling secretarial chairs is in direct contact.

The conductive layer 16 can be made in a number of different ways, but it has been found most advantageous and a preferred embodiment of this invention to have the conductive layer comprise a printing ink having a finite thickness and having lines that vary anywhere from 0.005 of an inch to ⅛th of an inch in width, but preferably ranging from 0.005 of an inch to 0.050 of an inch. Preferably, the printing ink is loaded with carbon black which makes it conductive, having a resistivity ranging from ½ ohm-cm to $10^9$ ohm-cm. It has been found that other materials may be utilized in inks or in thin paints to provide this conductive layer, all such that the resistivity of the lines so formed is within the desired range. These printed conductive lines are bonded to the top layer 22 by printing, hot melting adhesive or in any other desired manner so that the inner surface is secured to the second or upper surface 18 of the conductive layer 16. The structure thus formed can have the conductive lines in the shape of a rectangular arrangement 17 as shown in FIG. 1 or other geometric form. It will be noted that the outer surface 26 of the top layer 22 of the mat 8 does not have any conductive material directly on its surface and that layer 22 is normally made of a clear plastic material. The top layer 22 and the base layer 10 are normally made of similar plastic materials and can be selected from polyvinyl chloride, a polycarbonate base material, polyethylene, or any other plastic material that is fairly transparent to light passing therethrough. The basic requirements that exist in the choice of materials for the top layer 22 and the base layer 10 are that each be fairly transparent, that the top layer 22 be slightly conductive so that the conductive properties of the conductive layer 16 can be utilized, and that the base layer 10 be very slightly conductive to permit leakage of static charge to the substrate underlying the mat. The material of layer 10 must be sufficiently rigid, yet sufficiently flexible, to make a good chair mat. The materials used for the top layer 22 and the base layer 10 must have sufficient compatibility so that one may be secured to the other by adhesive or by hot melting or other such means so they (the chair mat) will not delaminate in use.

Figure 3:
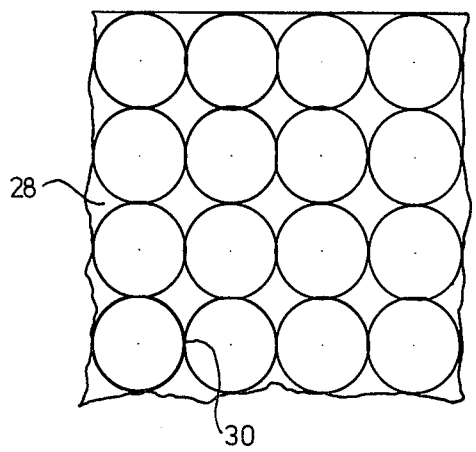
FIG. 3 is a partial plan view of a top segment of the invention hereof.
Figure 4:
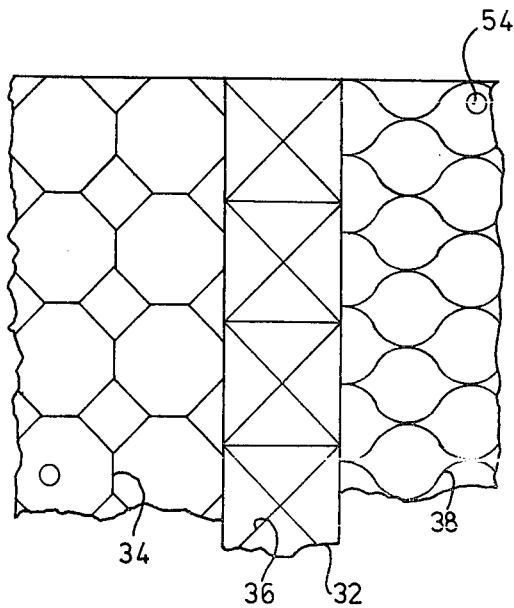
FIG. 4 is a partial top view of a segment of the invention hereof combining three different geometrical patterns, any of which may be used in the invention hereof.

In the embodiment of the invention, the conductive layer 16, whether formed by printing or by painting or another procedure may have a repetitive geometric pattern or a random or pseudo-random pattern. The rectangular grid pattern 17 shown in FIG. 1 is only one of many patterns that can be used. In FIG. 3, which depicts a segmented portion 28 of the chair mat 8, the top plan view illustrates an alternate grid pattern of conductive layer 16 and is shown as a connected circular pattern 30. In FIG. 4, three different geometric printed patterns are depicted, namely a hexagonal pattern 34, a triangular pattern 36, and a repetitive geometrical pattern 38. All of these patterns and others are fully contemplated by the invention and may be used individually or in combination. In a preferred embodiment of the invention, each of the geometric patterns whether used individually or in combination must have at least 50% open space. Therefore, when the conductive layer 16 is sandwiched between the top layer 22 and the base layer 10 the total mat structure will be transparent enough to let the color of a carpet underneath the chair mat come through so as to make the decor of the room more pleasing to the eye than would the case with the black chair mats of the prior art. In addition, conductive layer 16 is protected from abrasion by top layer 22, so that its electrical continuity will be maintained throughout the service life of the mat.

It has been found that when the top layer 22 is made of a plastic material that it ranges anywhere from 0.010 inch thick to as much as 0.060 inch thick. The thickness of the top layer 22 is in part controlled by the thickness of the conductive layer and its resistivity and by the resistivity of the material used for top layer 22. In a preferred embodiment of the invention the top layer 22 is approximately 0.020 inch thick and is secured to the conductive layer 16 which is in the form of an interconnected grid, and to the base layer 10 in the open areas of the grid. When surface electrodes are used to measure the surface resistivity of the outer surface 26 of the chair mat 8 it has been found that for low static generation and effective static dissipation the surface resistivity should not exceed $2\times10^{10}$ ohms.

In the preferred embodiment of the invention it has been found that the upper layer 22 is made from a vinyl material that is substantially transparent and has a thickness of approximately 0.020 inch and a volume resistivity of less than $2.4\times10^{10}$ ohm-cm when measured by the general methodology of ASTM-D257 using painted electrodes and a 500 volt potential. Further, base layer 10 is made from a vinyl material that is substantially transparent and has a thickness of 0.105 to 0.160 inch and a volume resistivity of less than $10^{13}$ ohm-cm when measured as described immediately above. When other means of making test measurements are used, the values obtained may be different from those above. It should be noted that a sufficiently conductive top layer 22 would obviate the need for conductive layer 16. However, the current state of the art in formulation of plastics does not permit attainment of the required degree of conductivity consistent with the desired transparency, durability and cost. On the other hand, conductive layer 16 would be quite ineffective if top layer 22 did not have at least some conductivity as set forth herein, which degree of conductivity is achievable currently. Therefore, it is only by the combination of these elements, each appropriately fabricated, that the objects of the invention can be achieved.

Figure 5:
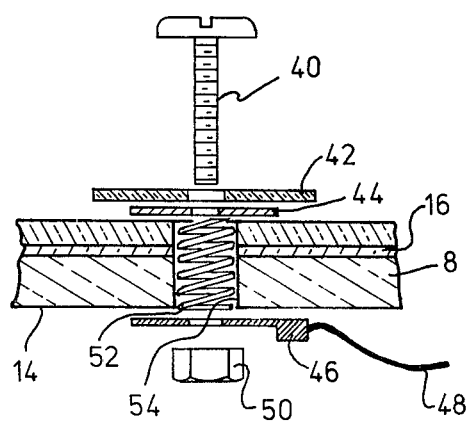
FIG. 5 is an exploded cross sectional view of the grounding system for the invention hereof.

In another embodiment of the invention a ground connection is provided for the mat 8 as shown in FIG. 5. A hole 54 is placed in mat 8, positioned anywhere with respect to the grid pattern, and may or may not intersect one of the pattern lines, inasmuch as the efficacy of the grounding does not depend on direct contact with conductive layer 16. Two examples of possible positions of hole 54 are shown in FIG. 4. As shown in FIG. 5 in an exploded view there is provided screw 40 made of insulating material and washer 42, having a hole therein for screw 40, also made of insulating material. Between washer 42 and upper surface 26 is a felt conductive washer 44 not less than 1⅜ inches in diameter that can be made by impregnating carbon black or graphite into a felt material. Alternatively, it is fully contemplated that a metallic washer or a conductive foam washer replace the felt washer. Adjacent the lower surface 14 is a ring terminal 46 connected to a ground wire 48. Also provided is a nut 50. When the unit comprising the screw 40, the washer 42, the washer 44, the spring 52, the ring terminal 46 with its ground wire 48 and nut 50 are all connected, clamping the mat 8, and the ground wire 48 is connected to a ground, then any static electricity generated on the outer surface 26 of the mat 8 or carried to that surface by an approaching person will be bled off to ground, although there is no obvious direct electrical connection between the conductive layer 16 and the ground wire 48. A relatively low resistance path actually exists from the washer 44 to the conductive layer 16 because of the partially conductive nature of the layer 22 and the fact that it is thin. This embodiment of the invention has been found quite advantageous in certain areas where high static electricity generation is prevalent because of working conditions or climate. In another embodiment of the invention, but not shown by drawings, a clip-type grounding unit similar to that shown in FIG. 5 can be fastened to the edge of the mat 8.

In another embodiment of the invention it has been found that the laminate structure comprising the mat 8 should have a semi-rigid structure being sufficiently stiff that chair casters can roll over it without making great dents in the material, but also having some flexibility so that the mat will conform to the contour of the surface that is under it and so that the mat will tend to resist stress cracking after repeated use. Further, it has been found advantageous in some instances to slightly emboss the outer surface 26 in order to render scratches arising from use less obvious and to impart a more pleasing appearance to the mat 8.

Although specific embodiments of the invention have been described, many modifications and changes may be made in the chair mat without departing from the spirit and scope of the invention as defined in the appending claims.

What is claimed is:

1. A chair mat for reducing the generation of static electricity from castered furniture rolling across the mat, and/or an individual walking across the mat and for dissipating the static electricity from a charged individual stepping onto the mat, the mat having an external edge and comprising:
    (1) a substantially transparent top layer having an outer surface and an inner surface and a bulk resistivity of less than $10^{11}$ ohm-cm,
    (2) a transparent conductive layer comprising an interconnected grid work pattern and having first and second outer surface areas, the second surface secured to the inner surface of the top layer, the conductive layer having a resistivity ranging from ½ to $10^9$ ohm-cm, the grid work pattern having lines with widths of at least 0.005 inches and a repetitive geometric conductive grid work pattern providing a small fraction of the surface area of the layer compared to the total surface area of the mat.
    (3) a transparent base layer having an outer surface and an inner surface, the inner surface secured to the first surface of the conductive layer, all layers forming a sandwich laminate structure such that the outer surface of the top layer of the mat has a surface resistivity of less than $2 \times 10^{10}$ ohms, the mat is at least 50% transparent so that the color of an underlying carpet can be easily seen through the whole mat and substantially preventing the generation of static electricity when castered furniture rolls a cross the outer surface; and
    (4) ground means connected to the outer surface of the top layer and the outer surface of the transparent base layer and isolated electrically from the gridwork pattern.

2. The mat of claim 1 wherein the grounding means consists of a conductive washer in contact with the outer surface of the top layer, a ring terminal connected to a grounding wire, a metallic spring which contacts and electrically connects said washer and said terminal, and a screw, nut and second washer which serve to retain said conductive washer, terminal and spring in proper relation to each other and to the outer surface of said mat, the conductive washer, terminal spring, screw, nut and second washer not in direct electrical contact with the conductive layer.

3. The mat of claim 1 wherein the grounding means is a strip of conductive material, having a resistivity ranging from ½ to $10^9$ ohm-cm, adhered to an outer surface of the mat and connectable to ground by a conventional wire.

4. The mat of claim 1 wherein the grounding means is a metal clip mounted on the edge and connected to ground by a conventional wire, the metal clip not making direct electrical contact with the conductive layer.

5. The mat of claim 1 wherein the grid comprises material selected from one or more of the following: carbon, carbon loaded printing liquid, metal particles, graphite, lamp black, conductive paint, metallic filaments, or conductive plastic filaments.

6. The mat of claim 1, wherein the grid comprises a printed carbon black ink pattern.

7. The mat of claim 1 wherein the grid comprises a printed pattern containing powdered metal particles.

8. The mat of claim 1 wherein the upper surface has an embossed configuration.

9. The mat of claim 1 wherein the laminate structure is semi-rigid and yet semi-flexible.

* * * * *